United States Patent
Hsiao et al.

(10) Patent No.: US 9,645,425 B2
(45) Date of Patent: May 9, 2017

(54) DRIVING CIRCUIT BOARD FIXING STRUCTURE AND LIQUID CRYSTAL DISPLAY DEVICE

(71) Applicant: Shenzhen China Star Optoelectronics Technology Co., Ltd., Shenzhen, Guangdong (CN)

(72) Inventors: Yuchun Hsiao, Guangdong (CN); Quan Li, Guangdong (CN); Guofu Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 45 days.

(21) Appl. No.: 14/769,807

(22) PCT Filed: Jul. 31, 2015

(86) PCT No.: PCT/CN2015/085806
§ 371 (c)(1),
(2) Date: Aug. 22, 2015

(87) PCT Pub. No.: WO2017/015976
PCT Pub. Date: Feb. 2, 2017

(65) Prior Publication Data
US 2017/0031200 A1    Feb. 2, 2017

(30) Foreign Application Priority Data
Jul. 31, 2015  (CN) .......................... 2015 1 0448444

(51) Int. Cl.
*G02F 1/1333* (2006.01)
*G02F 1/133* (2006.01)
(52) U.S. Cl.
CPC .... *G02F 1/133308* (2013.01); *G02F 1/13306* (2013.01); *G02F 2001/13332* (2013.01);
(Continued)

(58) Field of Classification Search
CPC ... G02F 1/133308; G02F 2001/133322; G02F 2001/133317; G02F 1/13306; G02F 2201/46; G02F 2001/13332; H05K 3/301
See application file for complete search history.

(56) References Cited

U.S. PATENT DOCUMENTS

2007/0284947 A1* 12/2007 Lee ..................... H01L 25/165
                                                       307/31
2008/0094810 A1*  4/2008 Lajara ................. H05K 7/1409
                                                       361/759
(Continued)

FOREIGN PATENT DOCUMENTS

CN    101996533 A    3/2011
CN    204090401 U    1/2015
(Continued)

*Primary Examiner* — Dennis Y Kim
(74) *Attorney, Agent, or Firm* — Andrew C. Cheng

(57) ABSTRACT

A driving circuit board fixing structure is disclosed. The structure includes a main body portion having a plate shape and multiple protrusion portions disposed on a surface of the main body portion. The multiple protrusion portions are disposed at intervals at the main body portion, and protrusion heights of the protrusion portions are gradually increased one by one from a first terminal of the main body portion to a second terminal of the main body portion. A liquid crystal display device is also provided. The driving circuit board fixing structure can fix COF substrates having different lengths with driving circuit boards having different sizes such that different backlight modules can be compatible with different liquid crystal panels in order to reduce the development cost of the backlight module.

20 Claims, 6 Drawing Sheets

(52) U.S. Cl.
CPC ............ *G02F 2001/133317* (2013.01); *G02F 2001/133322* (2013.01); *G02F 2201/46* (2013.01)

(56) References Cited

U.S. PATENT DOCUMENTS

2011/0075329 A1\* 3/2011 Cho ................... H05K 7/142
 361/679.01
2012/0134123 A1 5/2012 Hwang
2014/0375899 A1\* 12/2014 Ozeki ................... H04N 9/30
 348/791

FOREIGN PATENT DOCUMENTS

| | | |
|---|---|---|
| CN | 204143110 U | 2/2015 |
| JP | 2002077677 A | 3/2002 |
| JP | 2007334244 A | 12/2007 |

\* cited by examiner

DRIVING CIRCUIT BOARD FIXING STRUCTURE AND LIQUID CRYSTAL DISPLAY DEVICE

BACKGROUND OF THE INVENTION

1. Field of the Invention

The present invention relates to a display technology, and more particular to a driving circuit board fixing structure and a liquid crystal display device.

2. Description of Related Art

A COF (chip On Flex or Chip On Film) technology is a die soft film package technology for fixing an IC (integrated circuit) on a flexible circuit board. The COF technology utilizes a circuit board having a soft material as a carrier for packaging a chip. Through thermo-compression process, gold bumps on the chip are connected with inner leads of a circuit on the flexible substrate.

Usually, a circuit of a COF flexible substrate is provided with input terminal leads and output terminal leads. The output terminal leads are used to bond with a glass substrate of a liquid crystal display panel, and the input terminal leads are used to bond with a driving circuit board for generating a control signal.

In a developing process of a liquid crystal panel, because of the consideration for different demands, a panel having a same size will be installed with COF substrates having different lengths and driving circuit boards having different sizes. In a development process of a backlight module, in order to reduce a development of a mold, reduce a development cost and shorten a development period, a backlight module that is compatible with liquid crystal panels having different exterior sizes is preferred. Therefore, how to design a connection structure for COF structure and the driving circuit board such that a backlight module can be compatible with liquid crystal panels having different exterior sizes is a technology problem required to be solved.

SUMMARY OF THE INVENTION

In view of the deficiencies of the conventional art, the present invention provides a driving circuit board fixing structure and a liquid crystal display device such that a backlight module can be compatible with different liquid crystal panels.

In order to achieve the above purpose, the present invention adopts a following technology solution: a driving circuit board fixing structure, comprising: a main body portion having a plate shape; and multiple protrusion portions disposed on a surface of the main body portion, wherein, the multiple protrusion portions are disposed at intervals at the main body portion, protrusion heights of the protrusion portions are gradually increased one by one from a first terminal of the main body portion to a second terminal of the main body portion.

Wherein, each protrusion portion is a strip rib, and the multiple protrusion portions are parallel with each other.

Wherein, each protrusion portion is a protrusion block or a protrusion column, the multiple protrusion portions are disposed as multiple rows from the first terminal of the main body portion to the second terminal of the main body portion.

Wherein, the second terminal of the main body portion is provided with a first fixing hole.

Wherein, the driving circuit board fixing structure further includes a base seat disposed at the second terminal of the main body portion.

Wherein, the base seat includes a partition plate spaced apart from the main body portion.

Wherein, the partition plate is provided with a second fixing hole.

Wherein, the first terminal of the main body portion is provided with a guiding portion having a protrusion direction same as the protrusion portion, the outer surface of the guiding portion is inclined toward the second terminal.

Another purpose of the present invention is to provide a liquid crystal display device, comprising: a liquid crystal panel; a backlight module; a driving circuit board; a chip on film (COF) substrate connected between the liquid crystal panel and the driving circuit board; and a driving circuit board fixing structure, and having: a main body portion having a plate shape; and multiple protrusion portions disposed on a surface of the main body portion, wherein, the multiple protrusion portions are disposed at intervals at the main body portion, protrusion heights of the protrusion portions are gradually increased one by one from a first terminal of the main body portion to a second terminal of the main body portion; wherein, the driving circuit board fixing structure is disposed at a side of the backlight module, a bottom of the driving circuit board is disposed on the multiple protrusion portions of the driving circuit board fixing structure.

Wherein, the liquid crystal display device further includes a front frame, and the driving circuit board fixing structure is fixed at a sidewall of the front frame.

In the present invention, a fixing structure for fixing a driving circuit board inside a liquid crystal display device is provided. Multiple protrusion portions are disposed on a surface of a main body portion, and protrusion heights of the protrusion portions are gradually increased one by one such that the driving circuit board fixing structure can fix COF substrate having different lengths with driving circuit boards having different sizes so that different backlight modules can be compatible with different liquid crystal panels in order to reduce the development cost of the backlight module.

DETAILED DESCRIPTION OF THE PREFERRED EMBODIMENT

The following content combines figures and embodiments for detail description of the present invention.

Figure 1:
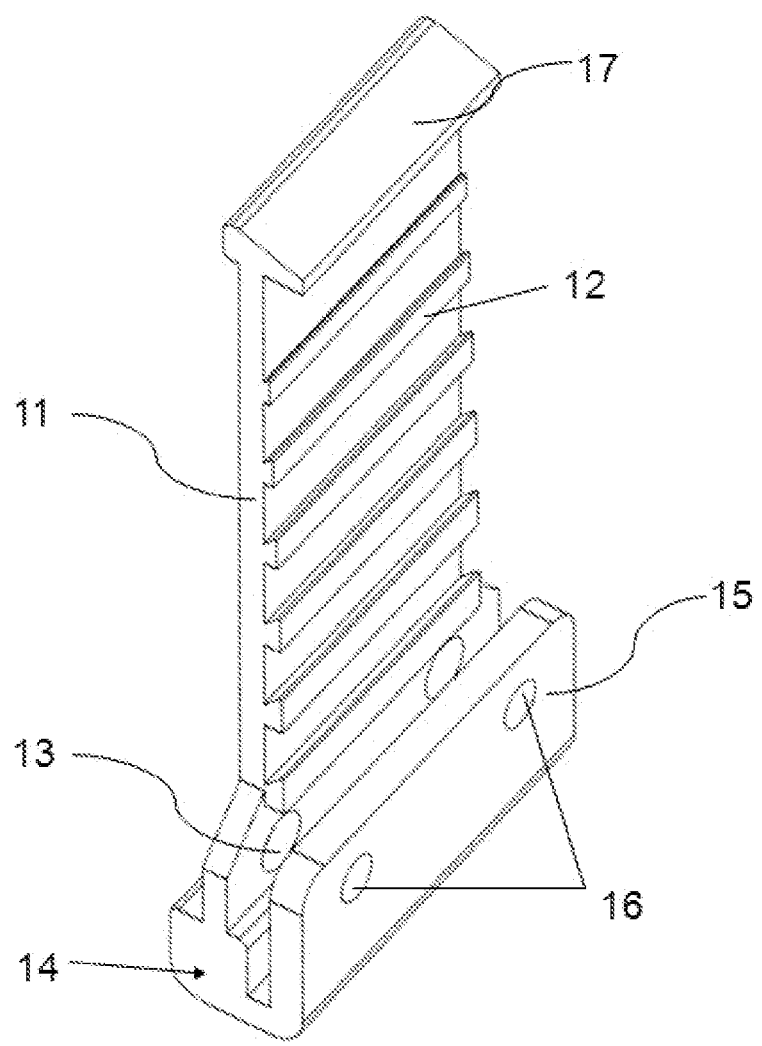
FIG. 1 is a schematic perspective view of a driving circuit board fixing structure according to an embodiment of the present invention.

With reference to FIG. 1, a driving circuit board fixing structure of the present invention includes a main body portion 11 having a plate shape and multiple protrusion portions 12 disposed on a surface of the main body portion 11. The multiple protrusion portions 12 are disposed at intervals at a height direction (that is, a vertical direction of FIG. 1) of the main body portion 11. Besides, at the vertical direction, protrusion heights of the protrusion portions 12 relative to the main body portion 11 are gradually increased one by one from top to bottom.

Figure 2:
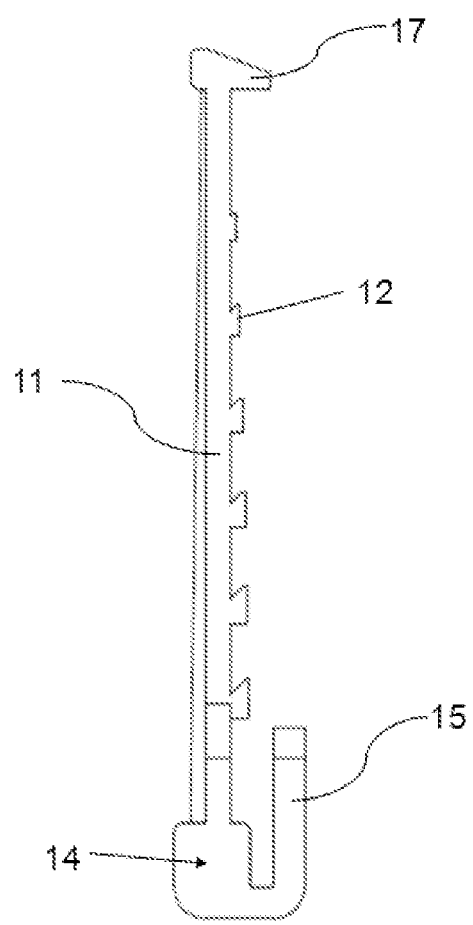
FIG. 2 is a schematic side view of a driving circuit board fixing structure according to an embodiment of the present invention.

As shown in FIG. 2, preferably, each protrusion portion 12 is a protrusion rib having a strip shape so as to form a supporting portion having a stepped shape at a side surface of the main body portion 11 for supporting a driving circuit board. Multiple protrusion ribs 12 are disposed at a same side surface of the main body portion 11, and are disposed in parallel with each other. Because protrusion heights of the protrusion ribs are gradually increased one by one from top to bottom, a driving circuit board can be selectively supported by a protrusion rib having a corresponding height according to a situation. At the same time, an inner side surface of the driving circuit board is attached with another protrusion rib at a top portion of the driving circuit board fixing structure such that a horizontal portion and a vertical portion of a driving circuit board are both limited in order to realize a supporting.

Figure 3:
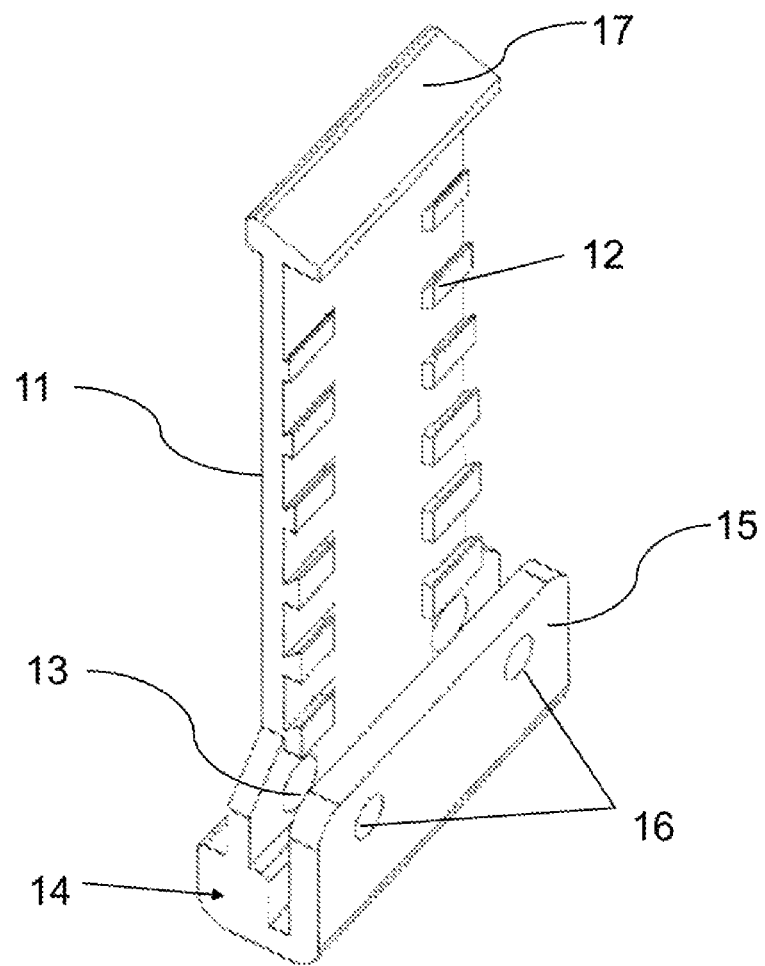
FIG. 3 is another schematic perspective view of a driving circuit board fixing structure according to an embodiment of the present invention.
Figure 4:
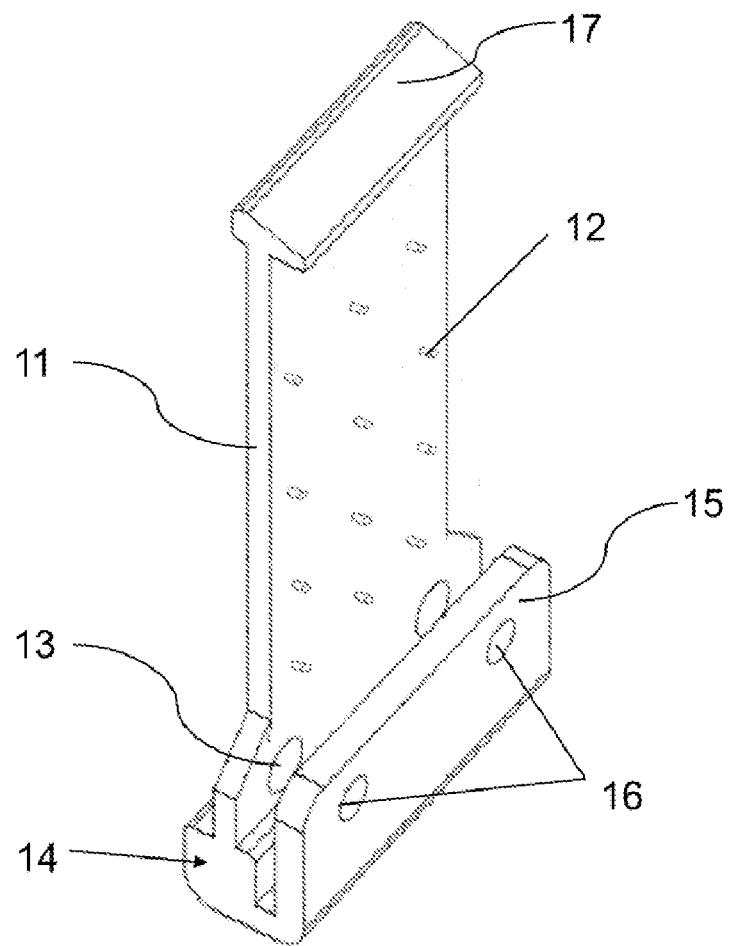
FIG. 4 is another schematic perspective view of a driving circuit board fixing structure according to an embodiment of the present invention.

Each protrusion portion 12 can also be a protrusion block or a protrusion column. In FIG. 3, the protrusion portion 12 is disposed as a protrusion block. In FIG. 4, the protrusion portion 12 is disposed as a protrusion column. Specifically, in a height direction of the main body portion 11, the protrusion portions 12 are disposed as multiple rows. Each row is provided with multiple protrusion portions 12 spaced apart in a horizontal direction. Protrusion heights of the protrusion blocks or protrusion columns in one row are the same. Heights of the protrusion blocks or protrusion columns are gradually increased row by row from top to bottom in order to achieve the same supporting effect.

A bottom portion of the main body portion 11 is disposed with a base seat 14, and a top portion of the main body portion 11 is disposed with a guiding portion 17 having a protrusion direction same as the protrusion portion 12.

Wherein, the base seat 14 includes a plate body portion connected with the bottom portion of the main body portion 11 and a partition plate 15 spaced apart from the main body portion 11. The plate portion which is connected between the base seat 14 and the main body portion 11 is provided with a pair of first fixing holes 13. The partition plate 15 is provided with a pair of second fixing holes 16. Through threaded fastener parts passing through the first fixing holes 13 and the second fixing holes 16, the driving circuit board fixing structure is fixed to another structure of a liquid crystal display device. A top surface of the guiding portion 17 is inclined downward. When a driving circuit board is inserted to the protrusion portion 12 of the fixing structure from top to bottom, the inclined structure of the guiding portion 17 has a guiding insertion function. At the same time, when the driving circuit board is completely inserted, the guiding portion 17 functions as a baffle plate for limiting the driving circuit board to prevent the driving circuit board from jumping out from a top.

The person of ordinary skill in the art can understand that the driving circuit board fixing structure can be formed integrally or be formed by multiple structures spliced together.

Figure 5:
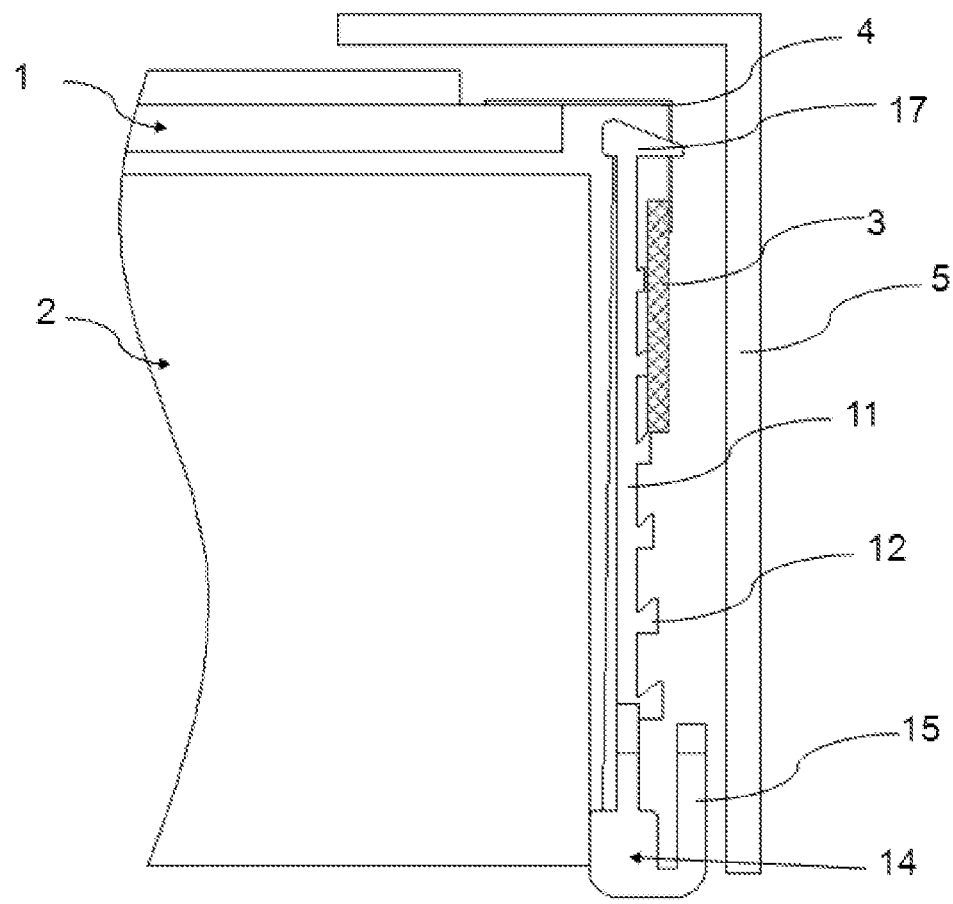
FIG. 5 is a schematic usage state diagram of a driving circuit board fixing structure according to an embodiment of the present invention.

With combined reference to FIG. 5, and FIG. 5 shows the driving circuit board fixing structure applied in the liquid crystal display device. The liquid crystal display device includes a liquid crystal panel 1, a backlight module 2, a driving circuit board 3, a COF substrate 4 connected between the liquid crystal panel 1 and the driving circuit board 3, and a driving circuit board fixing structure. The liquid crystal panel 1 is disposed above the backlight module 2. The driving circuit board fixing structure is disposed at a side of the backlight module 2. The driving circuit board 3 is inserted into the driving circuit board fixing structure, and the bottom of the driving circuit board 3 is disposed on a row of the protrusion portions 12 of the driving circuit board fixing structure. The inner side surface of the driving circuit board 3 is attached closely to an outer surface of the row of the protrusion portions 12. A front frame 5 is disposed at outer surfaces of the liquid crystal panel 1 and the backlight module 2 in order to have a protection function. Through this arrangement, the driving circuit board 3 is limited at both horizontal and vertical directions, and will not jump out from the fixing structure of the driving circuit board in the vertical direction.

Figure 6:
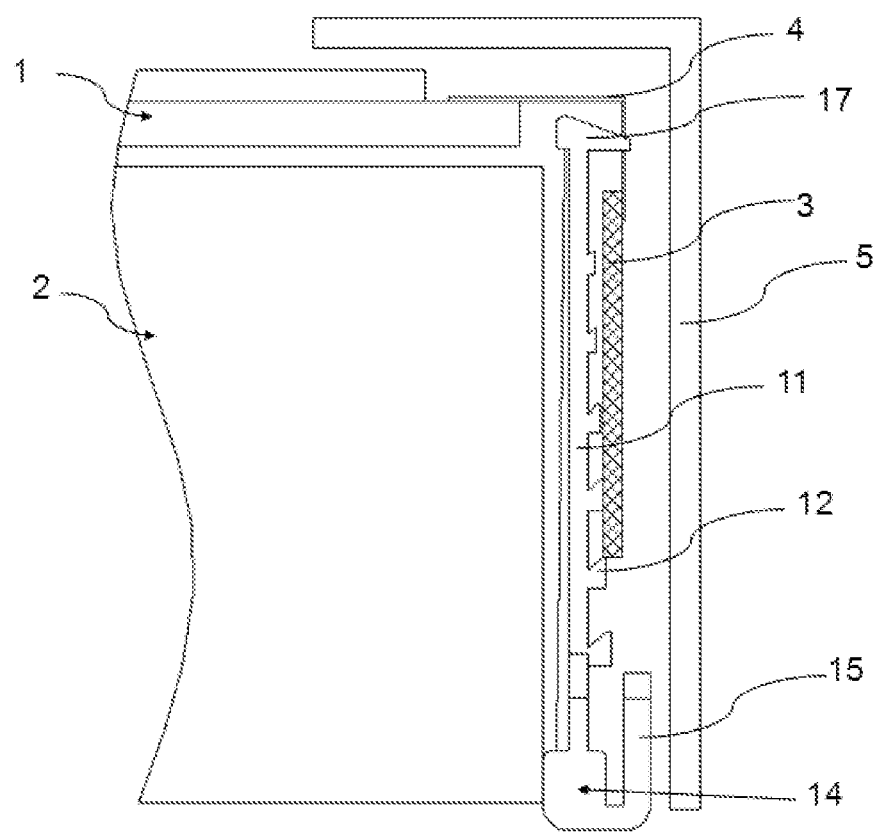
FIG. 6 is another schematic usage state diagram of a driving circuit board fixing structure according to an embodiment of the present invention.

As shown in FIG. 6, when a driving circuit board 3 is longer, the driving circuit board 3 can be inserted continuously. Another row of the protrusion portions 12 at the bottom can support the driving circuit board 3 such that the driving circuit board 3 can be completely inserted into the driving circuit board fixing structure. When a driving circuit board 3 is longer, the driving circuit board 3 can be inserted into a gap between a partition plate 15 of the base seat 14 and the main body portion 11. Accordingly, even sizes of the COF substrate and the driving circuit board are changed, redesign of the backlight module and the liquid crystal panel is not required such that different backlight modules can be compatible with different liquid crystal panels in order to reduce the development cost of the backlight module.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A driving circuit board fixing structure, comprising:
a main body portion having a plate shape; and
multiple protrusion portions disposed on a surface of the main body portion and adapted to support a driving circuit board directly, wherein, the multiple protrusion portions includes a first protrusion portion and a second protrusion portion located above the first protrusion portion such that a bottom of the driving circuit board is directly supported by the first protrusion portion having a height corresponding to the driving circuit board and an inner side surface of the driving circuit board is attached with the second protrusion portion, wherein, the multiple protrusion portions are disposed at intervals at the main body portion, protrusion heights of the protrusion portions are gradually increased one by one from a first terminal of the main body portion to a second terminal of the main body portion.

2. The driving circuit board fixing structure according to claim 1, wherein, each protrusion portion is a strip rib, and the multiple protrusion portions are parallel with each other, and a highest protrusion height of the first protrusion portion is greater than a highest protrusion height of the second protrusion portion.

3. The driving circuit board fixing structure according to claim 2, wherein, the driving circuit board fixing structure further comprises a base seat disposed at the second terminal of the main body portion.

4. The driving circuit board fixing structure according to claim 3, wherein, the base seat includes a partition plate spaced apart from the main body portion.

5. The driving circuit board fixing structure according to claim 4, wherein, the partition plate is provided with a second fixing hole.

6. The driving circuit board fixing structure according to claim 1, wherein, each protrusion portion is a protrusion block or a protrusion column, the multiple protrusion portions are disposed as multiple rows from the first terminal of the main body portion to the second terminal of the main body portion, and a highest protrusion height of the first protrusion portion is greater than a highest protrusion height of the second protrusion portion.

7. The driving circuit board fixing structure according to claim 1, wherein, the second terminal of the main body portion is provided with a first fixing hole.

8. The driving circuit board fixing structure according to claim 1, wherein, the driving circuit board fixing structure further includes a base seat disposed at the second terminal of the main body portion.

9. The driving circuit board fixing structure according to claim 8, wherein, the base seat includes a partition plate spaced apart from the main body portion.

10. The driving circuit board fixing structure according to claim 9, wherein, the partition plate is provided with a second fixing hole.

11. The driving circuit board fixing structure according to claim 1, wherein, the first terminal of the main body portion is provided with a guiding portion having a protrusion direction same as the protrusion portions, the outer surface of the guiding portion is inclined toward the second terminal.

12. A liquid crystal display device, comprising:
a liquid crystal panel;
a backlight module;
a driving circuit board;
a chip on film (COF) substrate connected between the liquid crystal panel and the driving circuit board; and
a driving circuit board fixing structure, and having:
a main body portion having a plate shape; and
multiple protrusion portions disposed on a surface of the main body portion and adapted to support a driving circuit board directly, wherein, the multiple protrusion portions includes a first protrusion portion and a second protrusion portion located above the first protrusion portion such that a bottom of the driving circuit board is directly supported by the first protrusion portion having a height corresponding to the driving circuit board and an inner side surface of the driving circuit board is attached with the second protrusion portion, wherein, the multiple protrusion portions are disposed at intervals at the main body portion, protrusion heights of the protrusion portions are gradually increased one by one from a first terminal of the main body portion to a second terminal of the main body portion;
wherein, the driving circuit board fixing structure is disposed at a side of the backlight module.

13. The liquid crystal display device according to claim 12, wherein, the liquid crystal display device further includes a front frame, and the driving circuit board fixing structure is fixed at a sidewall of the front frame.

14. The liquid crystal display device according to claim 12, wherein, each protrusion portion is a strip rib, and the multiple protrusion portions are parallel with each other, and a highest protrusion height of the first protrusion portion is greater than a highest protrusion height of the second protrusion portion.

15. The liquid crystal display device according to claim 12, wherein, each protrusion portion is a protrusion block or a protrusion column, the multiple protrusion portions are disposed as multiple rows from the first terminal of the main body portion to the second terminal of the main body portion, and a highest protrusion height of the first protrusion portion is greater than a highest protrusion height of the second protrusion portion.

16. The liquid crystal display device according to claim 12, wherein, the second terminal of the main body portion is provided with a first fixing hole.

17. The liquid crystal display device according to claim 12, wherein, the driving circuit board fixing structure further includes a base seat disposed at the second terminal of the main body portion.

18. The liquid crystal display device according to claim 17, wherein, the base seat includes a partition plate spaced apart from the main body portion.

19. The liquid crystal display device according to claim 18, wherein, the partition plate is provided with a second fixing hole.

20. The liquid crystal display device according to claim 12, wherein, the first terminal of the main body portion is provided with a guiding portion having a protrusion direction same as the protrusion portions, the outer surface of the guiding portion is inclined toward the second terminal.

* * * * *